United States Patent [19]

Stoll et al.

[11] 3,966,774

[45] June 29, 1976

[54] PROCESS FOR THE PRODUCTION OF AMINO-ANTHRAQUINONE

[75] Inventors: Paul Stoll, Basel; Istvan Toth, Bottmingen, both of Switzerland

[73] Assignee: Sandoz Ltd., Basel, Switzerland

[22] Filed: Aug. 6, 1973

[21] Appl. No.: 385,757

[30] Foreign Application Priority Data
Aug. 8, 1972 Switzerland............... 11700/72

[52] U.S. Cl. ............................................. 260/378
[51] Int. Cl.² ................. C07C 85/11; C07C 97/24
[58] Field of Search ................................. 260/378

[56] References Cited
UNITED STATES PATENTS
1,691,428  11/1928  Berthold ........................... 260/378

FOREIGN PATENTS OR APPLICATIONS
705,919  3/1954  United Kingdom................ 260/378

OTHER PUBLICATIONS

Weygand, Preparative Organic Chemistry, pp. 557–560, (1972).

*Primary Examiner*—Richard L. Raymond
*Attorney, Agent, or Firm*—Gerald D. Sharkin; Richard E. Vila; Joseph J. Borovian

[57] ABSTRACT

The present invention concerns a novel improvement in the catalytic hydrogenation of nitroanthraquinones to produce aminoanthraquinones, comprising over-hydrogenating the resulting aminoanthraquinone to the corresponding nuclear hydrogenated aminoanthraquinone and, after removal of the aminoanthraquinone, oxidising the remaining nuclear-hydrogenated aminoanthraquinone to aminoanthraquinone. Aminoanthraquinones are useful as intermediates in the production of anthraquinone dyestuffs.

28 Claims, 1 Drawing Figure

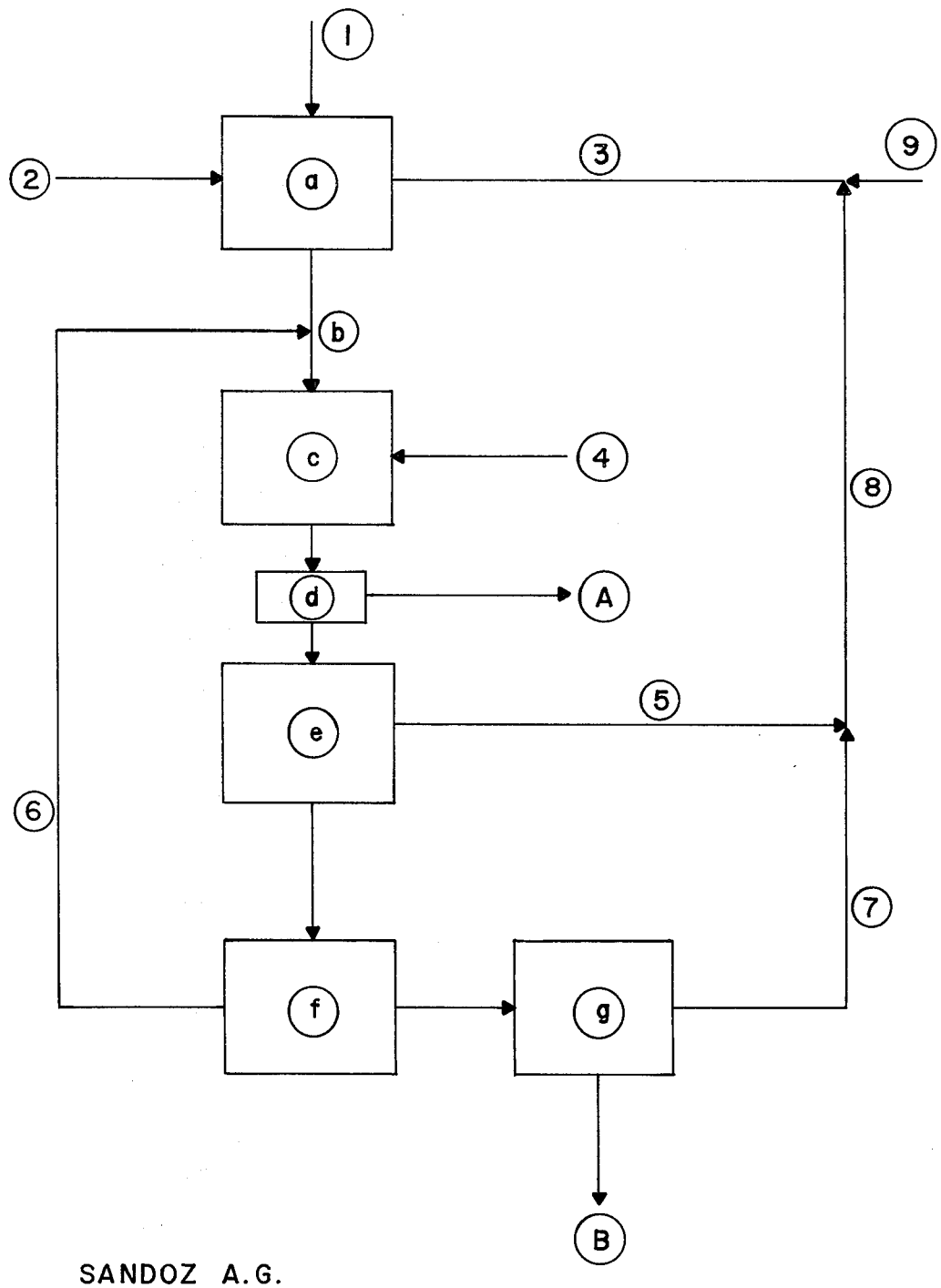
SANDOZ A.G.

PROCESS FOR THE PRODUCTION OF AMINO-ANTHRAQUINONE

The present invention relates to aminoanthraquinones and more specifically to a process for the production of aminoanthraquinones.

Aminoanthraquinones, in particular 1-aminoanthraquinone, are important intermediates in the synthesis of anthraquinone dyes. For such use, it is of importance to obtain the aminoanthraquinones in high yield and purity.

Accordingly, in a process for the production of an aminoanthraquinone from a nitroanthraquinone, which comprises hydrogenating the nitroanthraquinone in the presence of a solid hydrogenation catalyst and in an inert organic solvent in which the resulting aminoanthraquinone is soluble and the catalyst insoluble and removing the catalyst from the resulting aminoanthraquinone solution, the present invention provides the improvement consisting of hydrogenating the nitroanthraquinone in excess of the theoretical amount of hydrogen to over-hydrogenate part of the nitroanthraquinone to what is believed to be nuclear-hydrogenated aminoanthraquinone, removing the aminoanthraquinone, and oxidising the remaining nuclear-hydrogenated aminoanthraquinone to aminoanthraquinone.

By such improvement, aminoanthraquinone may be obtained in extremely high yields and, indeed, generally yields in the order 99 to 100% of theory are in practice possible.

According to a preferred aspect of the present invention the inert solvent is such that the resulting aminoanthraquinone is soluble therein at an upper temperature and insoluble therein at a lower temperature, the catalyst being removed at the upper temperature. The difference in temperature between the upper and lower temperatures is preferably from 40° to 150°C, e.g. from 50 to 130°C, more preferably from 60° to 125°C especially from 70° to 125°C, and conveniently said lower temperature is room temperature. As will be appreciated, in general, the solvent is preferably selected such that the temperature solubility gradient thereof in relation to the aminoanthraquinone (i.e. the rate of increase of solubility of the aminoanthraquinone with increase of temperature) is as large as possible. In addition the inert solvent is preferably such that the nuclear-hydrogenated aminoanthraquinone that is formed by over-hydrogenation of the resulting aminoanthraquinone is soluble therein at said lower temperature, and after removal of the catalyst at the upper temperature, the solution is cooled to the lower temperature and the aminoanthraquinone is removed from the solution. Preferably the nitroanthraquinone is hydrogenated in excess of the theoretical amount of hydrogen to the extent of 7%, especially between 0.5 and 6%, by weight of the resulting aminoanthraquinone. In further accordance with this preferred aspect of the invention, after removal of the resulting aminoanthraquinone, the nuclear-hydrogenated aminoanthraquinone remaining in solution is oxidised to aminoanthraquinone by reaction with nitroanthraquinone or a nitrohydrogenated derivative thereof of higher oxidative level than aminoanthraquinone, e.g. hydroxylaminoanthraquinone. One method of achieving oxidation of the nuclear-hydrogenated aminoanthraquinone is by recycling the final solution containing the nuclear-hydrogenated aminoanthraquinone, after removal of the aminoanthraquinone, into the initial reaction mixture containing the nitroanthraquinone and proceeding with hydrogenation. In this manner, the recycled nuclear hydrogenated aminoanthraquinone is allowed to react with the nitroanthraquinone or its hydrogenated derivatives of higher oxidative level than the aminoanthraquinone, i.e. with nitroanthraquinone, nitrosoanthraquinone or hydroxylaminoanthraquinone, and thereby be oxidised with simultaneous reduction of the nitroanthraquinone or its hydrogenated derivative. Such recycling of the final reaction solution after removal of the catalyst and then the aminoanthraquinone lends itself particularly to continuous operation of the process of the invention, by continuously recycling with addition of nitroanthraquinone starting material and catalyst, and replenishing with solvent, as necessary.

It will, however, be appreciated that the present invention lends itself not only to continuous operation, but also to semi-continuous or discontinuous operation, e.g. batch production.

The nitroanthraquinone employed as starting material may, for example, be a mononitro or dinitroanthraquinone such as 1-nitroanthraquinone, 2-nitroanthraquinone, 1,2-dinitroanthraquinone, 1,6-dinitroanthraquinone, 1,7-dinitroanthraquinone, 1,8-dinitroanthraquinone, 1,5-dinitroanthraquinone, 2,7-dinitroanthraquinone or 2,6-dinitroanthraquinone.

In addition the anthraquinone may comprise a single nitroanthraquinone or a mixture of nitroanthraquinone constituents. Preferably however, one nitroanthraquinone at least predominates and, for example, in the case of 1-nitroanthraquinone, preferably the 1-nitroanthraquinone predominates to at least 85%, more preferably at least 90%, e.g. 95–100% by weight. Moreover, it is not essential that the nitroanthraquinone employed as starting material be completely free from impurities and, for example, crude nitroanthraquinones obtained by nitration of anthraquinone and containing the impurities normally associated with this manner of production, e.g. small amounts of anthraquinone, may be employed as starting material in the process of the invention.

Suitable inert organic solvents are those which do not react with the starting, intermediate or final compounds and which are not subject to hydrogenation under the conditions of the reaction. In addition, and where necessary, solvents should fulfill the selective solubility requirements, e.g. as between the resulting aminoanthraquinone and the nuclear hydrogenated amino-anthraquinone, insofar as this is required. As example of suitable solvents, there may be mentioned liquid substituted or unsubstituted aromatic hydrocarbons such as an aromatic hydrocarbon petroleum fraction, e.g. having a boiling range of 170° to 200°C, xylene, e.g. m-xylene, toluene or chlorobenzene. Further examples of suitable solvents that may be mentioned are liquid ethers particularly arylalkyl ethers such as alkyl ($C_1$–$C_5$) ethers of phenol, which may be mono or polyalkyl substituted with a total of 1 to 6 carbon atoms in the alkyl substituents, or of dihydroxybenzene, in particular anisole, phenetol, hydroquinone dimethylether and resorcinol dimethylether. Aliphatic ethers may also be mentioned such as dialkylethers, e.g. di-n-butylether, or, preferably, mono or diethers of glycols, particularly derived from glycols of 2 to 4 carbon atoms or diethylene or triethylene glycols with aliphatic alcohols of 1 to 5 carbon atoms, especially diethylene glycol dimethylether, diethylene glycol monoethyl ether, ethylene glycol monoethyl ether and ethylene glycol dimethylether. Further ethers that may be mentioned are cyclic ethers such as dioxan or tetrahydrofuran. Other examples of suitable solvents that may be employed are carboxylic acid esters such as esters derived from aromatic acids, e.g. unsubstituted or substituted benzoic acid or aliphatic carboxylic acids with aliphatic alcohols ($C_1$–$C_5$), with glycols ($C_2$–$C_4$) or with cyclohexanol, in particular adipic diethyl ester, ethyl benzoate, cyclohexylacetate, ethyl 0-ethylsalicylate and ethylene glycol monoacetate.

For the production of 1-aminoanthraquinone, the liquid aryl-alkyl ethers, especially anisole and phenetol, are preferred.

The amount of solvent employed is, advantageously, as little as possible, to facilitate, selective solubility as between the resulting aminoanthraquinone and the nuclear hydrogenated aminoanthraquinone. Preferably, the ratio by weight of the amount of solvent to the amount of nitroanthraquinone is in the range 100:1 to 1:2, more preferably in the range 20:1 to 1:1.

The nitroanthraquinone may either be dissolved in the solvent, or may be suspended therein, preferably the former. In addition, as will be appreciated, it is not essential that the resulting amino-anthraquinone passes directly into solution immediately on its formation. It may, for example, precipitate out and later be dissolved by heating towards the end of the reaction.

As suitable hydrogenation catalysts, metal hydrogenation catalysts, preferably employed in finely dispersed form, offering as large an active surface as possible, may be employed, particularly noble metal catalysts e.g. palladium, platinum, ruthenium and rhodium, which may be employed with a carrier such as barium sulphate, strontium carbonate, calcium carbonate, silicon dioxide, aluminum sesquioxide and particularly active charcoal. Nickel catalysts, e.g. Raney nickel, may also be mentioned.

The amount of catalyst employed in the process of the invention is suitably 0.05 to 10% of the weight of nitroanthraquinone (including the weight of any catalyst carrier) and preferably 0.1 to 5% by weight.

The process of the invention is preferably effected with heating, e.g. to a temperature of up to 200°C, such as between 50° to 200°C, in particular from 80° to 160°C.

The hydrogen partial pressure may be up to 15 atmospheres, e.g. between 0.5 and 15 atmospheres, preferably between 0.5 and 10 atmospheres.

Naturally, the actual temperature and hydrogen partial pressure employed will depend on the nature and composition of the nitroanthraquinone employed as starting material, and also the solvent. Thus, when 1-nitroanthraquinone of at least 85% by weight purity is employed in an aryl-alkyl ether solvent, the preferred temperature is from 80° – 170°C more preferably from 100° to 150°C, and the partial pressure is preferably 0.5 to 10 atmospheres, more preferably 1 to 7 atmospheres.

The hydrogenation in accordance with the process of the invention is found in general to proceed with almost complete reaction of the hydrogen so that an almost stoichiometric quantity of hydrogen is consumed. The progress of the reaction may therefore be acceptably monitored on the basis of the amount of hydrogen employed. When the progress of the reaction is monitored chromatographically, in the view of the rather rapid rate of hydrogenation, the supply of hydrogen to the reaction mixture is preferably interrupted temporarily to terminate the reaction when chromatographic determinations are being effected.

After the completion of the reaction, the spent hydrogenation catalyst is removed from the resulting aminoanthraquinone solution, if necessary at an elevated temperature to dissolve the aminoanthraquinone, e.g. by filtration or by centrifuging. After removal of the spent catalyst, the resulting aminoanthraquinone may be removed from the solution, if necessary after concentration of the solution and reducing the temperature, by crystallisation and filtration. Alternatively, and especially in the case where substantially pure aminoanthraquinone is obtained, the resulting solution may be evaporated to dryness.

In one mode of effecting the process of the invention, particularly suitable for continuous and semicontinuous production of aminoanthraquinones, the nitroanthraquinone is dissolved or suspended in the inert organic solvent in a mixing and heating chamber and the catalyst added. The temperature of the mixture is then raised until the desired temperature has been reached. The hot mixture is then passed to a reaction chamber where hydrogen is blown therethrough, the reaction being effected adiabatically, isothermally or, if necessary, with positive or negative temperature adjustment by external heat exchange. After the required degree of hydrogenation, computed on the basis of the rate of hydrogenation, the reaction mixture then passes to a separating chamber where the spent catalyst is removed, e.g. by filtration, under conditions avoiding heat loss to maintain the desired aminoanthraquinone in solution. The solution is then passed to an evaporating chamber where part or all of the catalyst is removed. The solvent removed is recovered and recycled. Preferably, however, only part of the solvent is removed, and the concentrated solution is passed to a crystallisor whereupon, with cooling, aminoanthraquinone crystallises and is removed after passage to a filtration chamber. The filtrate cake, consisting of wet aminoanthraquinone, is passed to an evaporator where it is dried, the removed solvent being recovered and recycled. The mother liquor, recovered from the filtration is passed to the initial nitroanthraquinone/solvent mixing chamber to be recycled through the apparatus. This recycling of the mother liquor containing the nuclear hydrogenated aminoanthraquinone has the effect of oxidising the nuclear hydrogenated aminoanthraquinone by reaction thereof with nitroanthraquinone starting material or reduction derivatives thereof of higher oxidation level than the nuclear hydrogenated compound. Most economically, over-hydrogenation is effected to a distinct but low degree.

Examples of the process of the invention will now be described, in some cases, with reference to the accompanying drawing which shows a schematic flow diagram of a method of performing the present invention. In the following examples, where temperatures are referred to, there are in °C, where pressure is indicated in atmospheres, these are technical atmospheres and where a ratio of parts by volume to parts by weight is given, that is the same as of ml to g. Volumes are measured at STP unless otherwise indicated.

It is to be understood that where a hydrogen partial pressure is referred to throughout this specification, an excess pressure, i.e. above atmospheric pressure, is intended unless otherwise indicated.

EXAMPLE 1

With reference to the drawing, 26 parts of pure 1-nitroanthraquinone, 238 parts of anisole and 0.026 parts of a palladium/charcoal catalyst (5% Pd on active charcoal) are mixed with heating in a mixer *a* until the temperature rises to 110° and the 1-nitroanthraquinone is completely dissolved. The mixture is then fed via a pipeline *b* to a reactor *c* where hydrogenation is effected by blowing hydrogen through the solution at a partial pressure of 5 atmospheres, the reaction temperature increasing to, and being maintained at, 150°. Hydrogenation is effected until 4% overhydrogenation of the resulting aminoanthraquinone occurs, being determined by the amount of hydrogen consumed. After the reaction has been terminated by interruption of the hydrogen supply, the reaction mixture passes to a separator *d* where the spent catalyst is separated off by filtration of the warm reaction mixture. The filtrate is led to an evaporator/crystallisor *e* where the anisole is partly distilled off to concentrate the solution. 183 Parts of anisole are removed in this way and recovered for recycling. At this stage 1-aminoanthraquinone precipitates out. The precipitation increases with cooling. After precipitation the mixture is passed to a separator *f* and the 1-aminoanthraquinone is filtered off yielding a wet filtration cake and leaving 55 parts of mother liquor. The wet filtration cake is transported to an evaporator *g*.

The yield of the resulting dry and pure 1-aminoanthraquinone is 96% of theory.

With regard to the second cycle of operation, the solvent recovered from the evaporator *g* is led off via pipeline 7 and combined with solvent recovered from the evaporator/crystalliser which is led along pipeline 5, the combined solvent recovered being fed along pipelines 8 and 3 to the mixer *a*, the recovered solvent, fed to the mixer, being replenished as necessary via a top-up inlet 9. In the mixer *a*, the recovered catalyst, replenished as necessary, serves as solvent for a new charge of 1-nitroanthraquinone. After addition of a new charge of catalyst, mixing and heating, in analogous manner to that described above in relation to the first cycle, are effected and the mixture then passes to the reactor *c* via pipeline *b*. The 55 parts of mother liquor obtained by filtration of the precipitate in the separator *f* is recycled via pipeline 6 with an inlet to pipeline *b*. The recycled mother liquor contains overhydrogenated 1-aminoanthraquinone. In this manner, the overhydrogenated product passes with the new charge of reactants, to the reactor and the cycle is repeated. In this manner, the process may be effected continuously.

When effecting the process in the continuous manner, as described above, an overall yield of between 99 and 100% of 1-aminoanthraquinone is obtained.

EXAMPLE 2

Proceeding in analogous manner to that described in Example 1, and employing a 6% overhydrogenation rate of the aminoanthraquinone, 138 parts of anisole are distilled off in the evaporator/crystalliser *e* and 100 parts of mother liquor is obtained in the separator *f* which is recycled.

The yield on the first cycle amounts to 94% of theory and on recyclisation, to between 99 and 100% of theory.

EXAMPLE 3

300 Parts by weight of anisole are mixed with 27 parts of (97%) 1-nitroanthraquinone and 0.2 parts by weight of a palladium/charcoal catalyst (5% of Pd on active charcoal) and heated to 130° in an autoclave. At this temperature, hydrogen is blown through until the rate of up-take of the hydrogen has fallen to 10% of the original value. At this stage, about 2% of overhydrogenation product is present (ascertained by TLC). After interruption of the hydrogen supply, at 130°, 0.4 parts by weight of 1-hydroxylaminoanthraquinone are added and stirring is effected for 30 minutes. The catalyst is separated off at the upper temperature, the filtrate is concentrated and cooled and the 1-aminoanthraquinone is filtered off. No nuclear hydrogenated 1-aminoanthraquinone is present in the mother liquor. 23 Parts of 97% pure 1-aminoanthraquinone is obtained.

EXAMPLE 4

The procedure is analogous to that described in Example 3, using:
25 parts of anisole
5 parts of 1,5-dinitroanthraquinone (95% purity), and
0.1 parts of catalyst (5% of Pd on active charcoal), operating at 130°, 10 atm. and for a period of hydrogenation of 120 minutes.

Yield: 3.9 parts of 1,5-diaminoanthraquinone at 94% of purity.

EXAMPLE 5

The procedure is analogous to that described in Example 3, using:
250 Parts of anisole
13 Parts of 1,8-dinitroanthraquinone (96% purity) and
0.13 parts of catalyst (5% of Pd on active charcoal), operating at 130°, 10 atm. and for a time of hydrogenation of 10 minutes.

Yield: parts of 1,8-diaminoanthraquinone (96% purity).

What is claimed is:

1. A process for producing an aminoanthraquinone or a diaminoanthraquinone or mixtures thereof from a nitroanthraquinone selected from the group consisting of 1-nitroanthraquinone, 2-nitroanthraquinone, 1,2-dinitroanthraquinone, 1,6-dinitroanthraquinone, 1,7-dinitroanthraquinone, 1,8-dinitroanthraquinone, 1,5-dinitroanthraquinone, 2,7-dinitroanthraquinone, 2,6-dinitroanthraquinone, and mixtures thereof, comprising the steps of:
   a. hydrogenating said nitroanthraquinone, suspended or dissolved in an inert solvent selected from the group consisting of a liquid aromatic hydrocarbon, chlorobenzene, a liquid ether and a liquid carboxylic acid ester, with molecular hydrogen in the presence of a metal hydrogenation catalyst selected from the group consisting of noble metal and Raney nickel, at an upper temperature in the range of 50° to 200°C., and at a hydrogen partial pressure of between 0.5 and 15 atmospheres, the weight ratio of solvent to nitroanthraquinone being between 100:1 and 1:2 and the weight of catalyst being between 0.05 and 10% of the weight of nitroanthraquinone, the amount of hydrogen being in excess of the theoretical amount to overhydrogenate the nitroanthraquinone to nuclear-hydrogenated aminoanthraquinone;

b. continuing heating within said upper temperature range for sufficient time to dissolve all of the resulting hydrogenated products;

c. removing the catalyst within said upper temperature range;

d. cooling the reaction mixture to a lower temperature between 40° and 150°C. below said upper temperature, to precipitate the aminoanthraquinone;

e. recovering the precipitated aminoanthraquinone from the reaction mixture containing dissolved nuclear hydrogenated aminoanthraquinone; and f. reacting the nuclear-hydrogenated aminoanthraquinone with nitroanthraquinone or a hydrogenated derivative thereof of higher oxidative level than aminoanthraquinone to oxidize the nuclear-hydrogenated aminoanthraquinone to aminoanthraquinone, the solvent being selected so that at the upper temperature the aminoanthraquinone and nuclear-hydrogenated aminoanthraquinone are soluble therein and at the lower temperature, the aminoanthraquinone is substantially insoluble therein while the nuclear-hydrogenated aminoanthraquinone is soluble therein.

2. The process of claim 1 wherein said nitroanthraquinone is selected from the group consisting of 1-nitroanthraquinone, 2-nitroanthraquinone, or a mixture thereof.

3. The process of claim 1 wherein said nitroanthraquinone is selected from the group consisting of 1,2-dinitroanthraquinone, 1,5-dinitroanthraquinone, 1,6-dinitroanthraquinone, 1,7-dinitroanthraquinone, 1,8-dinitroanthraquinone, 2,6-dinitroanthraquinone, 2,7-dinitroanthraquinone, or a mixture thereof.

4. The process of claim 1 wherein said nitroanthraquinone is a mixture of mononitroanthraquinone and dinitroanthraquinone.

5. The process of claim 1, wherein up to 7% by weight of the resulting aminoanthraquinone is over-hydrogenated.

6. The process of claim 5, wherein between 0.5 and 6% by weight of the resulting aminoanthraquinone is over-hydrogenated.

7. The process of claim 1, wherein the nuclear hydrogenated aminoanthraquinone is oxidised by reaction with hydroxylaminoanthraquinone.

8. The process of claim 1, wherein the nuclear hydrogenated aminoanthraquinone remaining in solution is reacted with nitroanthraquinone or a hydrogenated derivative thereof, by recycling the nuclear-hydrogenated aminoanthraquinone in the reaction mixture.

9. The process of claim 8, wherein the nuclear-hydrogenated aminoanthraquinone is continuously recycled into the original reaction mixture as part of a continuous process.

10. The process of claim 2, wherein a single compound or a mixture in which a single compound predominates is used.

11. The process of claim 10, wherein 1-nitroanthraquinone is used and predominates to at least 85% by weight.

12. The process of claim 1, wherein the inert organic solvent is a liquid aromatic hydrocarbon.

13. The process of claim 12, wherein the inert organic solvent is an aromatic hydrocarbon petroleum fraction.

14. The process of claim 13, wherein the aromatic hydrocarbon petroleum fraction has a boiling range of 170°–200°C.

15. The process of claim 1, wherein the inert organic solvent is a liquid ether.

16. The process of claim 15, wherein the liquid ether is an aryl-alkyl ether.

17. The process of claim 16, wherein the aryl-alkyl ether is anisole, phenetol, hydroquinone dimethyl ether or resocinol dimethyl ether.

18. The process of claim 15, wherein the ether is an aliphatic ether.

19. The process of claim 18, wherein the aliphatic ether is a glycol ether.

20. The process of claim 19, wherein the glycol ether is monoethyl diethylene glycol.

21. The process of claim 1, wherein the inert organic solvent is a liquid carboxylic acid ester.

22. The process of claim 21, wherein the liquid carboxylic acid ester is ethyl benzoate.

23. The process of claim 1, wherein the hydrogenation catalyst is a noble metal catalyst.

24. The process of claim 23, wherein the noble metal catalyst is platinum or palladium.

25. The process of claim 24, wherein the catalyst is palladium on a carrier or active charcoal.

26. The process of claim 1, wherein the hydrogenation is effected at a temperature of between 80° and 160°C.

27. The process of claim 1, wherein said ratio is between 20:1 to 1:1.

28. The process of claim 1, wherein the amount of catalyst employed is betweeen 0.1 and 5% of the weight of the nitroanthraquinone.

* * * * *